United States Patent
Kellenbarger

[11] 3,804,549
[45] Apr. 16, 1974

[54] INTERNALLY PROPELLED FLYWHEEL ENGINE

[76] Inventor: Michael J. Kellenbarger, c/o George Spector, 3615 Woolworth Bldg. 233 Broadway, New York, N.Y.

[22] Filed: July 17, 1972

[21] Appl. No.: 272,557

[52] U.S. Cl................. 415/80, 60/39.34, 415/185
[51] Int. Cl................................................ F01d 1/18
[58] Field of Search.......... 415/80, 25, 81, 82, 182, 415/185; 60/39.34, 39.35; 74/5.7

[56] References Cited
UNITED STATES PATENTS

| | | | |
|---|---|---|---|
| 2,933,287 | 4/1960 | Caddell | 415/81 |
| 5,039 | 3/1847 | Galvani | 415/80 |
| 709,242 | 9/1902 | Prescott et al. | 415/80 |
| 814,187 | 3/1906 | Clark | 60/39.34 |
| 1,241,303 | 9/1917 | Thayer | 60/39.34 |
| 2,768,808 | 10/1956 | Worre | 415/80 |
| 3,032,988 | 5/1962 | Kleckner | 60/39.35 |
| 3,045,427 | 7/1962 | Baize et al. | 60/39.34 |
| 3,372,906 | 3/1968 | Griffith | 415/80 |
| 3,556,670 | 1/1971 | Tucker | 415/185 |

Primary Examiner—C. J. Husar

[57] ABSTRACT

This is an engine whose main moving part is an internally propelled flywheel encased within, and rotating within, a housing assembly consisting of two plate-like side members bolted together, with a power output shaft projecting from the rotor through these side members; said members containing alternating gas input ports and ignition ports arranged in concentric fashion about the shaft so that chambers inside the rotor (perpendicular to the plane of the rotor) are alternately exposed to the ports wherein said chambers receive gas at each gas input port with ignition occurring at each ignition port, and wherein the expanding gas is vented through jets in the housing tangential to the rotor, thus propelling the rotor and its shaft, and driving machinery attached thereto.

1 Claim, 4 Drawing Figures

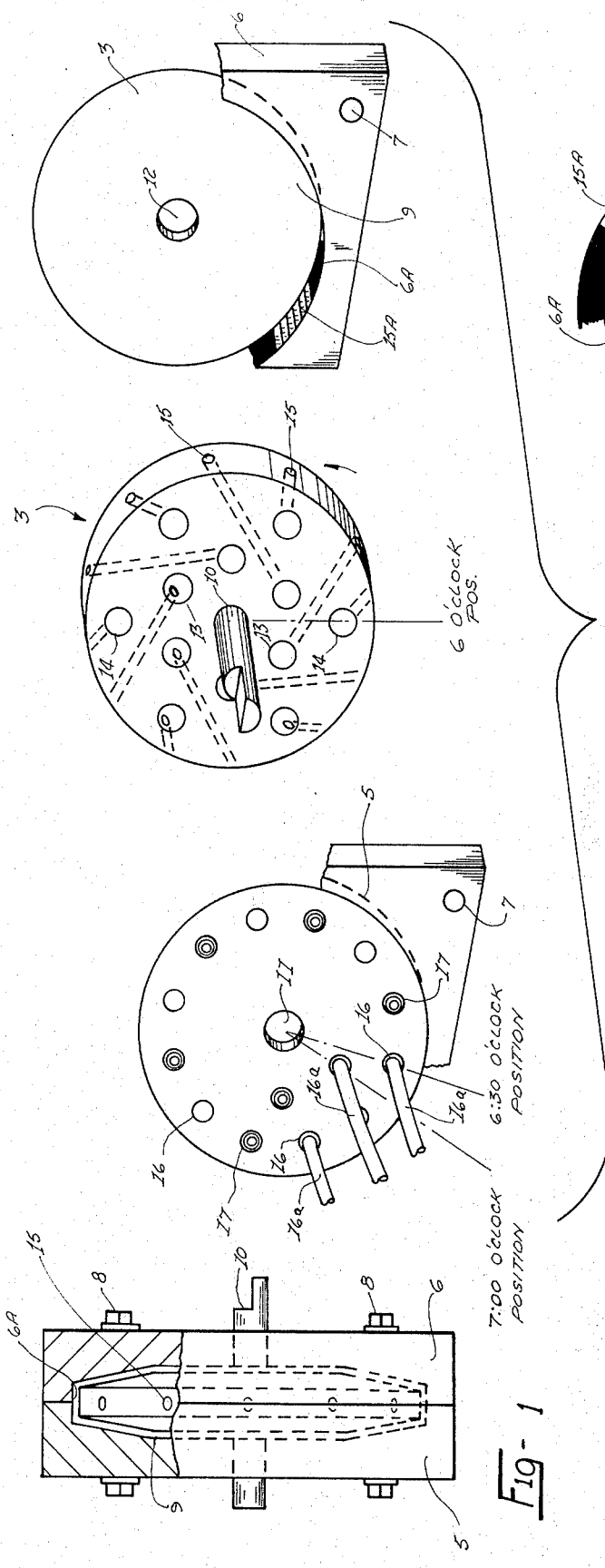
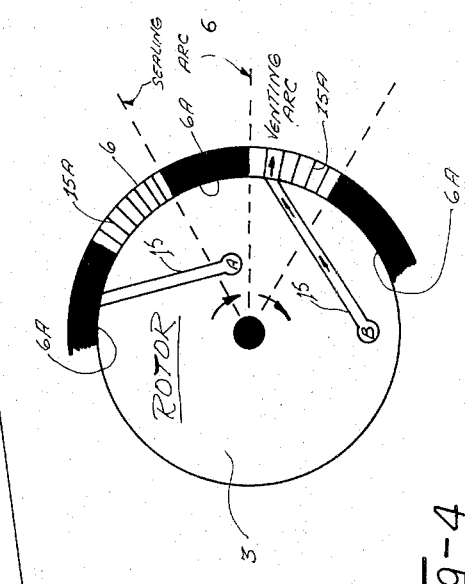
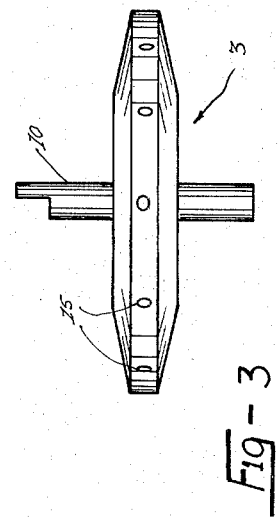

INTERNALLY PROPELLED FLYWHEEL ENGINE

This invention relates generally to engines.

A principle object of the present invention is to provide an improved new type of engine which has only one moving part so as to minimize wear and breakdown.

Another object is to provide an engine which accordingly would be ideal for use on equipment where reliability of operation is an essential, such as on aircraft and the like.

Another object is to provide an engine designed to give very low emission impurity by virtue of its adaptability to all feasible fuels, especially the methane series, and by its adaptability to various propulsion modes, to wit: internal combustion, external combustion, and steam propulsion.

Other objects are to provide an internally propelled flywheel engine which is simple in design, inexpensive to manufacture, rugged in construction, easy to use and efficient in operation.

These and other objects will be readily apparent upon a study of the following specification and the accompanying drawings:

FIG. 1 is an end elevation of the Internally Propelled Flywheel Engine (in partial cross-section).

FIG. 2 represents an exploded perspective view of the basic components of this invention.

FIG. 3 is an end view of the flywheel rotor.

FIG. 4 is a schematic drawing of the rotor relative to the housing showing the means for containing and venting gas.

Referring now to the drawings in detail, the reference numerals 5 and 6 refer to the opposing plate-like side members of generally square configuration which are provided with bolt holes 7 near their corners through which bolts 8 are received for the purpose of securing the side members together. Reference numeral 9 refers to a large circular cavity contained within 5 and 6 in which the flywheel rotor 3 (see FIG. 3) is placed. The shaft 10 is secured in the center of the rotor 3, and extends therethrough. While rotor 3 is contained between sides 5 and 6, rotor shaft 10 is using shaft holes 11 and 12 as support bearings and projecting therethrough. The rotor has a plurality of concentric axially extending equally spaced apart chambers 13 and 14; there may be several concentric circles of such chambers. From these chambers radiate diagonal exhaust jet openings 15 outward to the rotor periphery. on side member 5 there are provided alternating gas input ports 16 and ignition plugs 17, which bring gas via lines 16a and ignition respectively from outside the housing, through the housing, and into the cavity 9. The ports 16 and plugs 17 communicate alternately with rotor chambers 13 and 14, as they rotate by.

FIG. 4 illustrates how the housing member 6 regulates the containment and the release of gases from the rotor chamber: when a rotor chamber is in position A, gas entering the chamber is blocked from exiting through jet 15, along the length of sealing arcs (darkened area) provided in the surrounding portions 6a of the housing member. As a chamber rotates to a position B, expanding gases are jetted out through openings 15 and scalloped channels 15a formed in the housing member 6 transversely tangential to the rotor 15 providing thereby venting arcs alternating with the sealing arcs.

In operative use a rotor chamber, rotating clockwise, is aligned first with a gas input port 16 wherein the gas is forced into the chamber with no exit because of the sealing surface 6A. (This is a 6:30 o'clock position.) Further rotation isolates the chamber from 16, with still no exit. (This is a 7:00 o'clock position). Continued rotation brings the chamber in contact with ignition plug 17 whereby the gas is ignited. (This is a 7:30 o'clock position.) At this moment the exhaust jet 15 leaves its sealing arc and begins its venting arc through channels 15A. (This is the 8:00 o'clock position.) As the jet 15 propels rotor 3 toward the 8:30 position, the chamber is emptied of the expanding gas. At the 8:30 position, a new sealing arc is engaged and more gas is forced through the next gas input port 16 into the chamber as did happen at the 6:30 position. Inertia carries the exhaust jet through its sealing arc. Jetting gas impinges upon numerous fixed blades formed between channels 15A in the housing member 6 and propelling thereby the exhaust jet through its venting arc.

The hereinabove disclosed engine can use gases provided from external combustion, whereby the very high pressure of previously combusted gases is piped through 16, filling each rotor chamber that communicates with 16. These gases can immediately exit through 15 and channels 15A eliminating the need for alternate sealing arcs and ignition plugs. Likewise steam under very high pressure will propel this engine. Therefore, the cleanliness of steam and the completeness of external combustion make this engine an efficient, versatile, and ecologically safe engine.

Unlike conventional engines which have weight limitations, this engine has none with regard to weight-power ratio. In fact for many uses, the larger the flywheel the better. The power of this engine depends mostly on two factors: the mass of the rotor and its revolutions per minute; as either one increases, so also does the potential power. With one moving part and its inherent symmetry, this engine has no major cause for vibration and no theoretical upper limit on r.p.m. This is very advantageous.

Since the engine rotor is like the common gyro, it can be made to demonstrate stability characteristics of a gyro: in an automobile, when this rotor is mounted with its rotor axis perpendicular to the ground, can be made to prevent automobile turn-over on road curves!

Another asset of this engine is its ability to amass much more torque than other more conventional engines by virtue of the aforementioned power factors and characteristics. This means that when this engine is compared in theory to a conventional piston engine of the same weight, or to a conventional gas/steam turbine of the same weight, this engine will have more available power to overcome the initial inertia of its attached vehicle or machinery. This is most advantageous.

Since the rotor acts like a flywheel, it is to be distinguished from the blades and fan-type mechanisms of conventional gas/steam turbines. Therefore all conceivable flywheel shapes such as discs, discoids, globes, bars, "heavy propellers", paddle wheels, etc. are hereby encompassed in the term "flywheel" as set forth in this engine description.

While various changes may be made in the detail construction, it is understood that such changes will be within the spirit and scope of the present invention as is defined by the appended claims.

I claim as follows:

1. A internal combustion rotary flywheel engine comprising a housing having an internal circular cavity with a circular rotor mounted therein having a transverse power shaft attached to the rotor center extending outward of the housing, said housing having bearing apertures aligned with said shaft, including equispaced transverse chambers in said rotor disposed along a circle with ducts communicating at one end with said chambers and at opposite ends with the rotor periphery, said housing having alternate sealing surfaces and exhaust ports adjacent to and encircling the rotor whereby rotation of said rotor causes the ducts to alternately contact the sealing surfaces and communicate with the ports, further including transverse fuel inlets equi spaced about a circle through the housing in intermittent alignment with the rotor chambers during rotor movement, in combination with spark plugs in the housing disposed between the inlet chambers whereby rotation of the rotor causes alternate alignment of each chamber with an inlet and spark plug, wherein said sealing surfaces and ports are so spaced that a duct is in contact with a sealing surface when an inlet is in alignment with the respective chamber whereby an exhaust port is in communication with a duct when the spark plug is aligned with a chamber.

* * * * *